(No Model.) 4 Sheets—Sheet 1.
W. S. SIMPSON.
DRIVE OR SPROCKET CHAIN AND WHEEL THEREFOR.
No. 550,540. Patented Nov. 26, 1895.
*Fig. 1.*
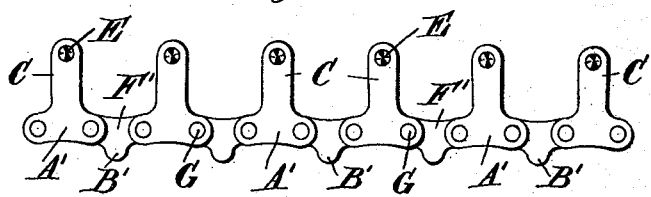
*Fig. 2.*
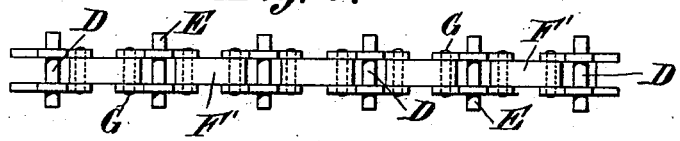
*Fig. 3.* *Fig. 4.*
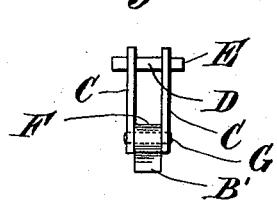 
*Fig. 5.*
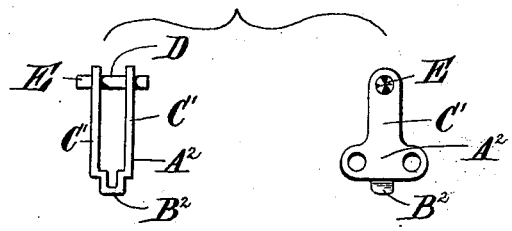
Witnesses.
A. H. Norris
Rhut Errett
Inventor.
William S. Simpson.
By James L. Norris.
Atty.

(No Model.) 4 Sheets—Sheet 2.

W. S. SIMPSON.
DRIVE OR SPROCKET CHAIN AND WHEEL THEREFOR.

No. 550,540. Patented Nov. 26, 1895.

Witnesses.
A. H. Norris.
Robert Everett.

Inventor.
William S. Simpson.
By James L. Norris
Atty (No Model.) 4 Sheets—Sheet 3.
W. S. SIMPSON.
DRIVE OR SPROCKET CHAIN AND WHEEL THEREFOR.
No. 550,540. Patented Nov. 26, 1895.

(No Model.) 4 Sheets—Sheet 4.

W. S. SIMPSON.
DRIVE OR SPROCKET CHAIN AND WHEEL THEREFOR.

No. 550,540. Patented Nov. 26, 1895.

Witnesses.
A. H. Norris.
Robert Everett.

Inventor.
William S. Simpson.
By James L. Norris.
Atty.

UNITED STATES PATENT OFFICE.

WILLIAM SPEIRS SIMPSON, OF LONDON, ENGLAND.

DRIVE OR SPROCKET CHAIN AND WHEEL THEREFOR.

SPECIFICATION forming part of Letters Patent No. 550,540, dated November 26, 1895.

Application filed September 23, 1895. Serial No. 563,376. (No model.) Patented in England December 27, 1894, No. 25,150; in France January 18, 1895, No. 244,425, and in Belgium January 19, 1895, No. 113,712.

*To all whom it may concern:*

Be it known that I, WILLIAM SPEIRS SIMPSON, a subject of the Queen of Great Britain, residing at 49 Battersea Park Road, London, England, have invented certain new and useful Improvements in Drive or Sprocket Chains and Wheels Therefor, (for which I have obtained patents in Great Britain, No. 25,150, dated December 27, 1894; in France, No. 244,425, dated January 18, 1895, and in Belgium, No. 113,712, dated January 19, 1895,) of which the following is a full, clear, and exact specification.

This invention has for its object to provide a new and improved drive or sprocket chain and wheel therefor particularly designed for bicycles and other wheeled vehicles, but useful for many other purposes, whereby power necessary to drive a wheel through the medium of the chain is considerably reduced, and if used in connection with a bicycle or other wheeled vehicle, the latter can be operated with much less fatigue to the rider than where an ordinary sprocket-chain is used. To accomplish this object my invention involves the features of construction, the combination or arrangement of parts, and the principles of operation hereinafter described and claimed, reference being made to the accompanying drawings, in which—

Figure 6:
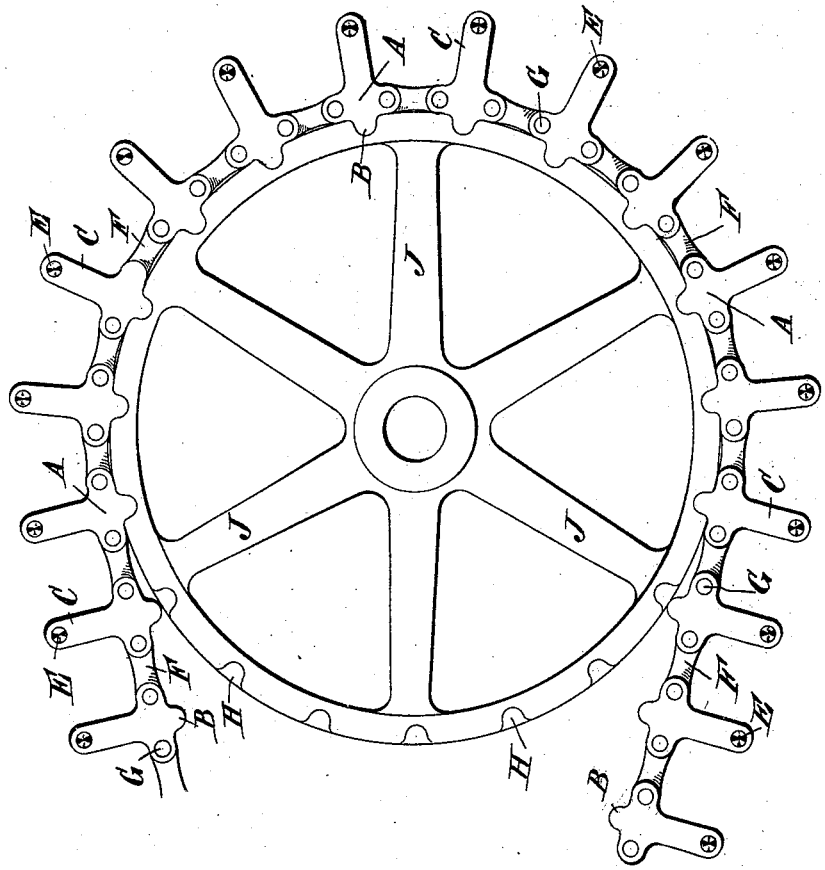
Figure 7:
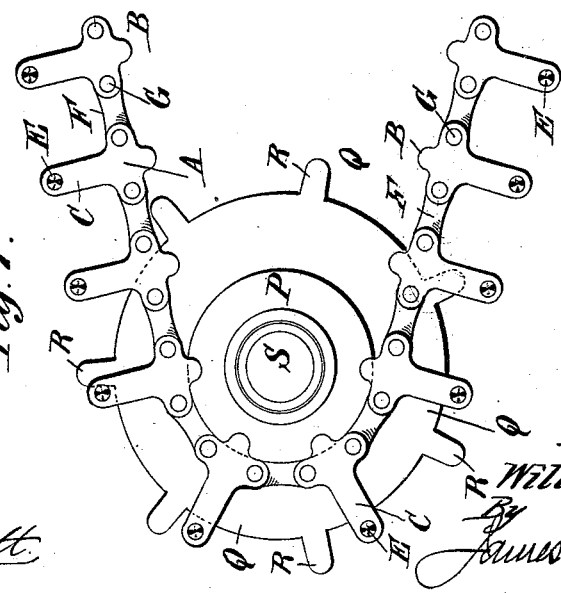
Figure 8:
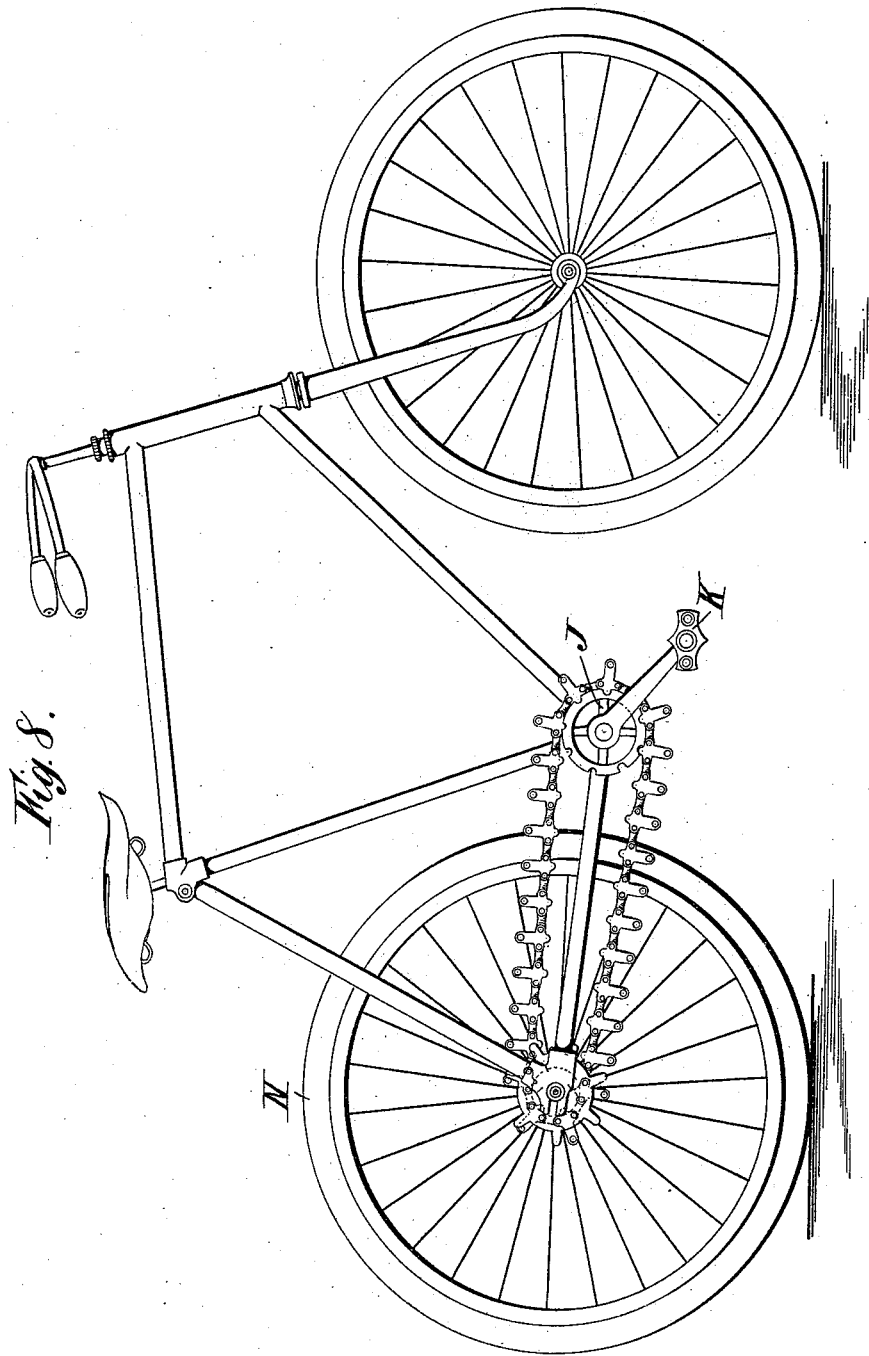
Figure 9:
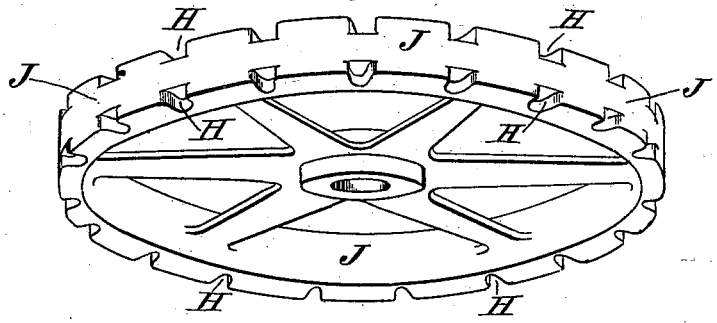
Figure 10:
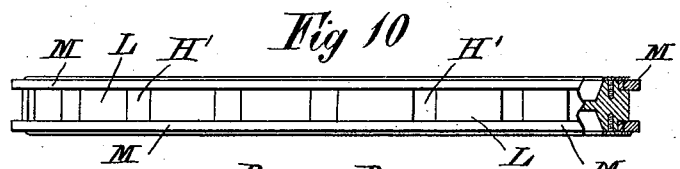
Figure 11:
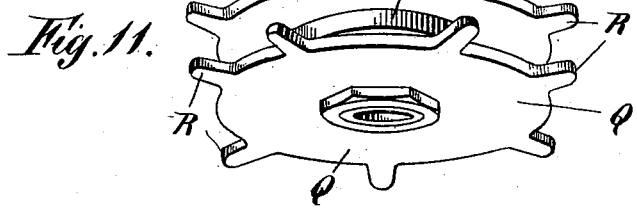
Figure 12:
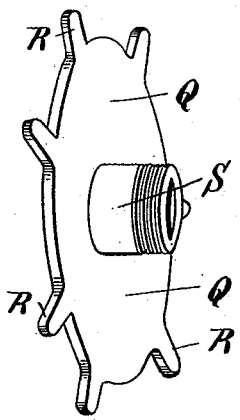
Figure 13:
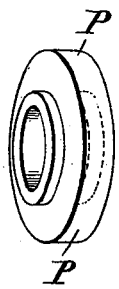
Figure 14:
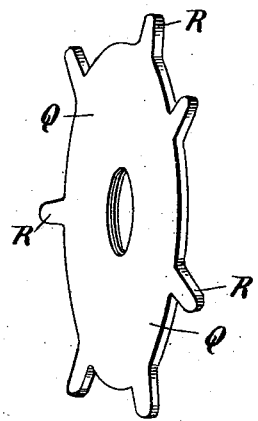

Figure 1 is a detail side elevation showing a portion of my improved drive or sprocket chain. Fig. 2 is a plan view of the same. Fig. 3 is a detail view of one of the chain-links. Fig. 4 is a detail perspective view of one of the connecting-links. Fig. 5 is an edge view and side view of a modified form of link. Fig. 6 is a detail side elevation showing a driving-wheel and a portion of the improved drive or sprocket chain constructed according to another modification of my invention. Fig. 7 is a side elevation of a wheel engaged with a portion of a drive or sprocket chain constructed the same as shown in Fig. 6. Fig. 8 is a side elevation of a bicycle provided with my invention, the drive or sprocket chain and wheels engaged thereby being constructed the same as shown in Figs. 6 and 7. Fig. 9 is a perspective view of the front driving-wheel to operate in connection with the form of drive or sprocket chain shown in Figs. 6 and 7. Fig. 10 is a detail view, partly in section, of a driving-wheel to operate in connection with the form of drive or sprocket chain shown in Figs. 1, 2, 3, and 4. Fig. 11 is a perspective view of the wheel to be connected with the rear driving-wheel of a bicycle or other wheel which is to be driven, and Figs. 12, 13, and 14 are detail perspective views of the parts composing the wheel represented in Fig. 11.

In order to enable those skilled in the art to make and use my invention, I will first describe the construction of drive or sprocket chain illustrated in Figs. 5, 6, and 7. In these figures the letters A indicate the chain-links, having at their inner edges lugs or spurs B and at their opposite edges outwardly-projecting arms or tails C of considerable length. Each chain-link, as herein illustrated, is composed of two of the parts A, B, and C, arranged at some distance apart, with the arms or tails C connected by a cross-pin D, the extremities of which project some little distance to form the laterally-extending studs E. The links above mentioned are pivotally connected together through the medium of intermediate connecting-links F and pivot-pins G, so that the chain-links and the intermediate links constitute a drive or sprocket chain with the parts properly articulated together.

In Figs. 5, 6, and 7 above mentioned it will be observed that the lugs or spurs B form parts of the chain-links A; but the lugs or spurs can be omitted from the chain-links A and placed upon the intermediate connecting-links F', as at B' in Figs. 1, 2, 3, and 4. If the form of drive or sprocket chain shown in Figs. 1, 2, 3, and 4 is employed and the intermediate links F' are provided with the lugs or spurs B', while the main chain-links A' are constructed with plain bottom edges, the chain will be employed in connection with a wheel L, Fig. 10, hereinafter referred to.

The lugs or spurs B of the chain-links A, Figs. 6 and 7, are designed to engage notches H in the peripheral edges of a wheel J, Figs. 6 and 9, which wheel will be rotated through the medium of pedal-cranks or other suitable means. If, however, the lugs or spurs B' are placed on the intermediate links F', as in the form of chain represented in Figs. 1, 2, 3, and 4, the lugs or spurs B' will engage central notches H' of the wheel L, represented in Fig. 10. When the wheel J, Figs. 6 and 9, is employed in connection with the lugs or spurs B on the main chain-links A, the plain lower edges of the intermediate connecting-links F, Fig. 6, will bear upon the plain central peripheral part of the wheel J, as will be best understood by reference to Fig. 9. If, on the contrary, the lugs or spurs B' are on the intermediate connecting-links F', the lugs or spurs will engage the central notches H' of the wheel L, Fig. 10, and the plain bottom edges of the main chain-links A' will act on the loose rings M forming a part of the wheel L.

In Fig. 5 I illustrate an edge and a side view of a modified form of chain-link. In this modification the link $A^2$ is formed of a single piece of metal bent to form parallel arms or side bars C', and a projecting lug or spur $B^2$. The cross-pin D, with its projecting ends or studs E, is the same as the cross-pin described with reference to the other figures. With a chain constructed of links made according to the showing in Fig. 5 the lugs or spurs, as at $B^2$, will engage the central notches H' between the rings M of the wheel L. (Shown in Fig. 10.)

In Fig. 8 I have illustrated my invention applied to a bicycle for the purpose of driving the rear drive-wheel N thereof. The drive or sprocket chain shown in Fig. 8 is constructed the same as the chain shown in Figs. 6 and 7. The drive or sprocket chain is designed to ride freely on a loose ring P, mounted on a hub S, as will be understood by reference to Figs. 7, 11, 12, 13, and 14. The hub S is provided with two disk-like plates Q, having their peripheries constructed with radial teeth R. The hub S is designed to be connected to the axle of the drive-wheel N, Fig. 8, and the laterally-extending parts E of the cross-pins D engage and release the teeth R to impart motion to the wheel composed of the hub S and disk-like plates Q. The center of the hub S is so relatively arranged to the other parts that considerable leverage is obtained to rotate the drive-wheel N, thereby materially reducing the power necessary to impart motion to the drive-wheel. Where the invention is applied to a bicycle or other wheeled vehicle, the latter can be operated with much less fatigue to the rider than where ordinary drive or sprocket chains are employed.

The hub S, loose ring P, and disk-like plates Q, with their radially-extending teeth R, constitute in effect a wheel driven by the drive or sprocket chain, but, as before stated, in applying this wheel to a bicycle it becomes a part of or is attached to the axle of the drive-wheel N, Fig. 8.

I do not wish to be understood as confining myself to the use of my invention in connection with a bicycle or similar wheeled vehicle operated by a rider, as obviously the improved drive or sprocket chain and wheel therefor can be employed for many different purposes without altering the spirit of my invention.

Having thus described my invention, what I claim is—

1. The combination with a wheel comprising a hub, disks mounted on the hub and provided with radial teeth, and a loose ring also mounted on the hub, of a drive-chain comprising pivotally connected chain-links having outwardly extending arms provided with lateral studs to engage the teeth of the disks, substantially as described.

2. The combination with a wheel having notches in its periphery, and a wheel comprising a hub, disks mounted on the hub and having radial teeth, and a loose ring also mounted on the hub, of a drive or sprocket-chain composed of pivotally connected links having lugs or spurs to engage the notched wheel, and outwardly extending arms provided with lateral studs to engage the teeth of the said disks, substantially as described.

3. A drive or sprocket-chain composed of pivotally connected links having outwardly projecting arms provided with laterally extending studs fixed in relation to the said arms, so that they constantly maintain the same distance from the inner edges or bases of the links, substantially as and for the purposes described.

4. A drive or sprocket chain, consisting of pivotally connected links, each link being composed of two parallel arms or bars projecting outward from a base portion and connected at their outer ends by a cross-pin, the extremities of which extend laterally in the form of studs, said cross-pins being fixed with relation to the outwardly projecting arms so that they constantly maintain the same distance from the inner edges or bases of the links, substantially as and for the purposes described.

5. The combination with two wheels, of a connecting drive or sprocket chain composed of pivotally connected links having lugs or spurs at their inner edges and provided with outwardly extending arms having at their end portions laterally projecting studs, substantially as described.

6. A drive or sprocket chain, consisting of a plurality of pivotally connected links having spurs or lugs B, and outwardly projecting arms C provided at their end portions with cross-pins D having their extremities projecting to form lateral studs E, substantially as and for the purposes described.

WILLIAM SPEIRS SIMPSON.

In presence of—
HENRY GARDNER,
RICHARD CORE GARDNER.